United States Patent [19]

Todt et al.

[11] 4,197,463
[45] Apr. 8, 1980

[54] COMPENSATED SELF-POWERED NEUTRON DETECTOR

[75] Inventors: William H. Todt, Elmira Heights, N.Y.; Norman P. Goldstein, Murrysville, Pa.

[73] Assignee: Westinghouse Electric Corp., Pittsburgh, Pa.

[21] Appl. No.: 909,418

[22] Filed: May 25, 1978

[51] Int. Cl.² ............................................. G01T 3/00
[52] U.S. Cl. .................................................... 250/390
[58] Field of Search ................ 250/390, 391, 392, 370

[56] References Cited

U.S. PATENT DOCUMENTS

| | | | |
|---|---|---|---|
| 3,259,745 | 4/1966 | Garlick et al. | 250/390 |
| 3,375,370 | 3/1968 | Hilborn | 250/390 |
| 3,603,793 | 9/1971 | Warren | 250/390 |
| 3,787,697 | 1/1974 | Shields | 250/390 |
| 3,872,311 | 3/1975 | Goldstein et al. | 250/390 |
| 4,008,399 | 2/1977 | Brown | 250/390 |

OTHER PUBLICATIONS

Sovka, J. A., "Response of Cobalt Neutron Flux Detectors," Atomic Energy of Canada Limited, Jun. 1969, Report AECL-3368.

Primary Examiner—Alfred E. Smith
Assistant Examiner—Janice A. Howell
Attorney, Agent, or Firm—W. G. Sutcliff

[57] ABSTRACT

An improved compensated self-powered neutron detector is detailed wherein a thin conductive layer of low neutron cross section, high density material is disposed about the emitter core and also on the interior of the collector sheath. The conductive layer about the emitter absorbs low average energy electrons produced by emitter material activation products. The provision of the inner and outer conductive shield layers insures that signal current due to the response of these shielding layers to external gamma rays will be nullified and the detector device compensated to provide a detector which primarily responds to neutrons.

4 Claims, 2 Drawing Figures

COMPENSATED SELF-POWERED NEUTRON DETECTOR

BACKGROUND OF THE INVENTION

The present invention relates to self-powered neutron detectors. A self-powered neutron detector basically consists of a neutron responsive emitter core, an insulator layer which retains high electrical resistivity even when continuously exposed to intense radiation fields, and a conductive collector layer which produces few electrons or gamma rays in a neutron flux as compared with the emitter core material. The detector is termed self-powered because there is no need to impose an operating voltage across the emitter and conductor electrodes. Neutrons are absorbed by the emitter and give rise to an electron current between the emitter and the collector which is externally measured as the detector signal current.

Nuclear reactor in-core safety systems require prompt response miniature neutron detectors for measurements of variations in local power densities. Self-powered detectors utilizing cobalt as the emitter material for a prompt response characteristic have been used for in-core safety applications. The cobalt emitter core of such self-powered detectors utilizes the captured gamma rays which result from the absorption of an incident neutron by a cobalt nucleus in the emitter core. The resulting outward flow of these gamma rays produces, by means of interactions with the detector material, a net outward flow of high average energy prompt electrons. This displacement of charge results in a current flow between the emitter and collector which is externally measured in a high sensitivity ammeter. The current produced is proportional to the instantaneous neutron flux. A sensitivity problem exists for such detectors where the emitter material has activation products which decay with time, such as a cobalt emitter detector which exhibits a build up of cobalt activation products with time of exposure. These cobalt activation products emit low average energy beta electrons and also gamma rays which cause a delayed current background signal that increases with detector irradiation.

An improved self-powered prompt response detector which minimizes the effect of such delayed currents produced from activation products is described in U.S. Pat. No. 3,872,311, owned by the assignee of the present invention. The teaching of the aforementioned patent is to provide a thin conductive layer of low neutron cross section, high density material about the emitter core material. This high density layer absorbs beta radiation emitted by the emitter core activation products, but is substantially transmissive to the high average energy prompt electrons emitted by the emitter core material. The materials which have been suggested for use as the conductive, low average energy beta absorptive layers are platinum, bismuth and lead. These materials even in a thin layer have the effect of increasing the sensitivity of the device to external gamma rays, and thereby decrease the neutron to gamma signal ratio for the detector. It is desirable to compensate for the increased gamma sensitivity of the conductive low average energy beta absorptive layer so that the detector is primarily neutron responsive.

SUMMARY OF THE INVENTION

An improved prompt response self-powered neutron detector is described wherein a low average energy beta absorptive conductive layer is provided about the emitter core, and a similar layer is provided on the interior surface of the collector electrode. The provision of these similar conductive material layers, one on the exterior surface of the central emitter core electrode, and the other on the interior surface of the outer collector electrode insures that in a neutron-gamma flux the resultant electron flow produced from the two layers will be in opposite directions to cancel each other out and to thus be self-compensating. The detector can therefore be designed by an appropriate choice of thickness for the two layers to produce the neutron response which is characteristic of the emitter core material but with little or no response to external gamma rays. The conductive layers are preferably formed of the same material such as platinum, bismuth, or lead which are high density materials with low neutron cross-section.

DESCRIPTION OF THE PREFERRED EMBODIMENT

Figure 1:
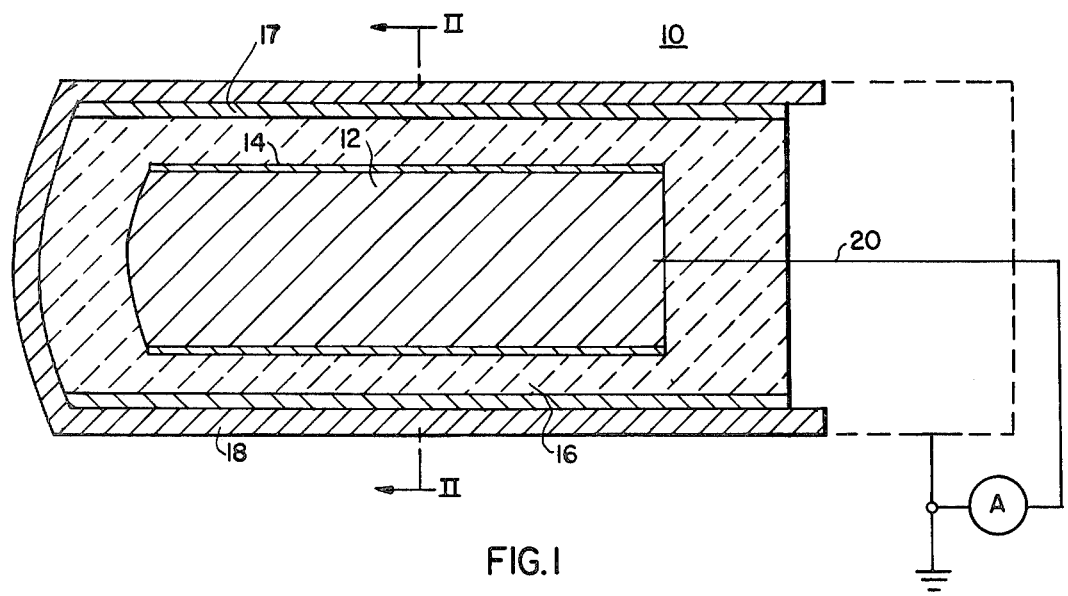
FIG. 1 is an elevational view and cross-section of a self-power detector of the present invention.
Figure 2:
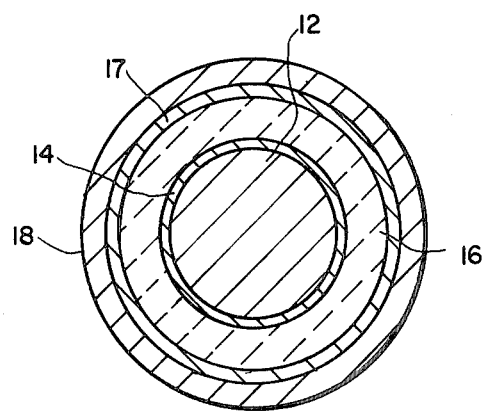
FIG. 2 is a cross-sectional view taken along lines II—II of FIG. 1.

The self-powered neutron detector of the present invention is seen in detail in FIGS. 1 and 2. The self-powered neutron detector 10 comprises a neutron absorptive emitter core 12 which is comprised of a material having a high neutron cross-section that spontaneously produces high average energy prompt electrons in a two step process upon capturing neutrons. The emitted radiation from the emitter core 12 includes high average energy prompt electrons produced by emitted gamma rays from the neutron capture process, and also delayed lower average energy beta radiation emitted by decay of the activation products of the emitter core material. The emitter core material is selected from cobalt gold or other such high neutron cross-section material. A cobalt core is basically cobalt-59 which gives rise to high average energy prompt electron emission in a neutron and gamma flux. Cobalt has activation products cobalt-60 and cobalt-61 which produce relatively low average energy delayed beta electron emission. A first thin conductive layer 14 of low neutron cross-section, high density material is disposed about and in electrical contact with the emitter core 12. This high density conductive layer 14 is absorptive of the beta radiation emitted by the decay of the emitter core activation products, but is substantially transmissive to the high average energy prompt electrons emitted by the emitter core. The thin conductive layer 14 is formed of a low neutron cross-section material selected from the group of platinum, bismuth, and lead. A layer of electrically insulating material 16 which maintains high resistivity upon extended exposure to high neutron flux is provided about the thin conductive layer 14. The insulating layer 16 is typically densely compacted magnesia or alumina. A second thin conductive layer 17 of low neutron cross-section, high density material is then disposed about the insulator layer 16. The second conductive layer 17 is preferably formed of the same conductive material as forms the first conductive layer 14. While it is not essential that the first and second layer 14 and 17 are formed of the same material it is easier to balance their effects when the same material is used with some adjustment of the layer thicknesses. An outer conductive collector sheath 18 is provided about and in electrical contact with the second thin conductive layer 17. The outer conductive collector sheath 18 is typically stainless steel or other such high nickel content steel which shows relatively low neutron sensitivity. The detector signal current results from neutron capture in the emitter core which produces high average energy prompt electrons which pass through the first conductive layer 14 and are collected in the second conductive layer or the outer conductive collector sheath which are electrically connected, and read as the detector signal current. A high sensitivity ammeter A is electrically connected via lead 20 to the emitter core 12 and to the collector sheath 18 to read the detector current. The inner high density thin conductive layer 14 has to be thin enough to allow a substantial number of the high average energy prompt electrons from the core to pass through it, but thick enough to stop a substantial fraction of the delayed lower average beta radiation emitted from the core. The thickness of the outer high density conductive layer 17 is selected so that the current produced from it by an external gamma ray field would be as equal as possible to that produced from the first inner high density layer 14. The electron flow from the first and second conductive layers 14 and 17 are in opposite directions and in essence nullify each other. The resultant detector has a neutron response characteristic of the emitter core material with little or no response to external gamma rays.

The self-powered detector has a relatively small overall diameter which permits its in-core usage. By way of example, typically detector diameters are limited to about 80 mils. For optimum sensitivity the emitter core should be as large as possible, and for an 80 mil overall diameter detector the emitter diameter is typically about 20 mil. The emitter material is a high neutron cross-section material such as cobalt or gold or other such material which has neutron capture activation products which decay by emission of low average energy beta electron emission. The first and second thin, conductive, high density layer of platinum, bismuth or lead is typically about 1 to 3 mils each in thickness. The insulator layer of alumina or magnesia is typically about 10 to 20 mils thick. The other conductive collector sheath is typically several mils thick.

A prompt response self-powered detector has thus been provided which compensates for objectionable delayed response currents while resulting in a detector with a neutron response of the emitter material and little or no response to external gamma rays.

What we claim is:

1. In a self-powered neutron detector which comprises a radiation absorptive emitter core comprised of a material of high neutron cross-section that spontaneously emits radiation upon capturing neutrons, which emitted radiation includes high average energy prompt electrons produced by emitted gamma rays from the neutron capture process and delayed lower average energy beta radiation emitted by decay of activation products of the emitter core material, a thin conductive layer of low neutron cross-section, high density material is disposed about the emitter core, which high density material is absorptive of the lower average energy beta radiation emitted by decay of the emitter core activation products, but is substantially transmissive to the high average energy prompt electrons emitted by the emitter core, with a layer of electrically insulating material about the thin conductive layer, and an outer conductive collector sheath about the insulating material layer, the improvement wherein a thin layer of low neutron cross-section, high density material is also disposed between the insulating material layer and the outer conductive collector sheath to compensate the detector for effects of signal currents generated by external gamma rays in the layer of the low neutron cross-section, high density material about the emitter core, and thereby provide a detector with a neutron response which is characteristic of the emitter core material.

2. The detector set forth in claim 1, wherein the thin conductive layers of low neutron cross-section, high density material is selected from the group of platinum, bismuth and lead.

3. The detector set forth in claim 1, wherein the emitter core material is selected from the group consisting of cobalt and gold.

4. The detector set forth in claim 1, wherein the thin conductive layers are of platinum with the platinum layers being about 0.001–0.003 inch thick.

* * * * *